W. H. LANNING, Jr.
CLUTCH.
APPLICATION FILED JUNE 12, 1911.
1,002,853.
Patented Sept. 12, 1911.
2 SHEETS—SHEET 1.
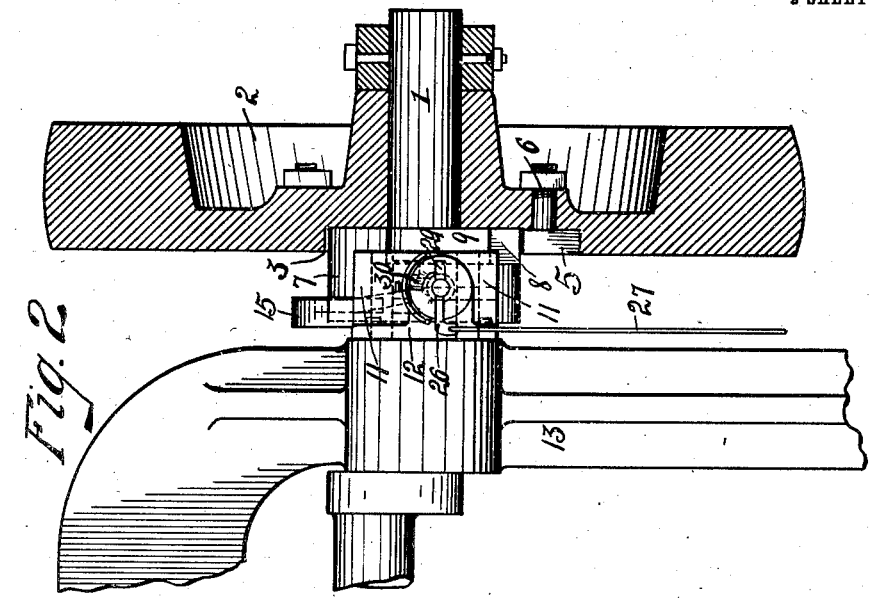
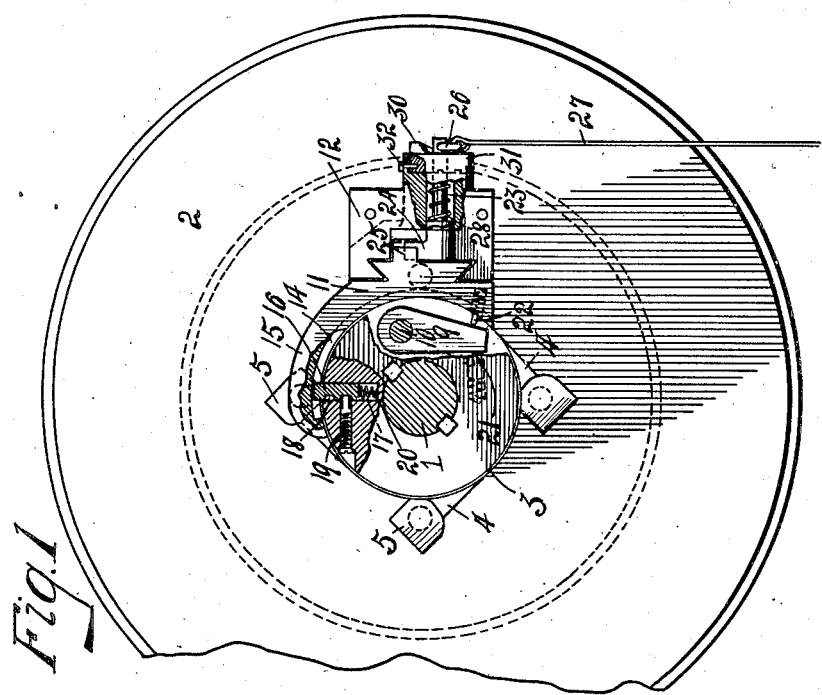
WITNESSES.
C. E. Walker.
E. E. Thomas.
INVENTOR.
Wm H. Lanning Jr,
By Owen & Owen.
His attys.

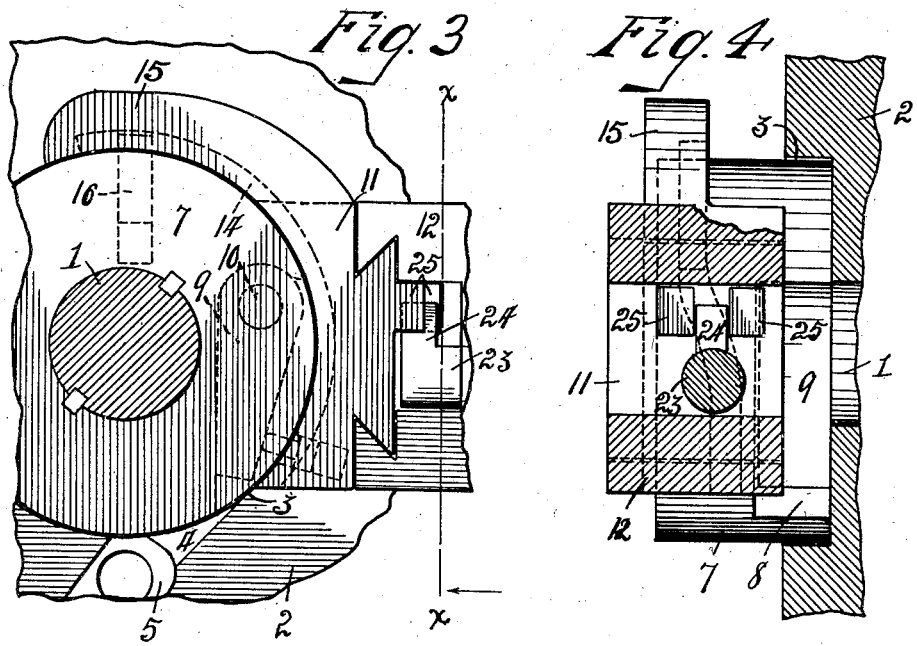
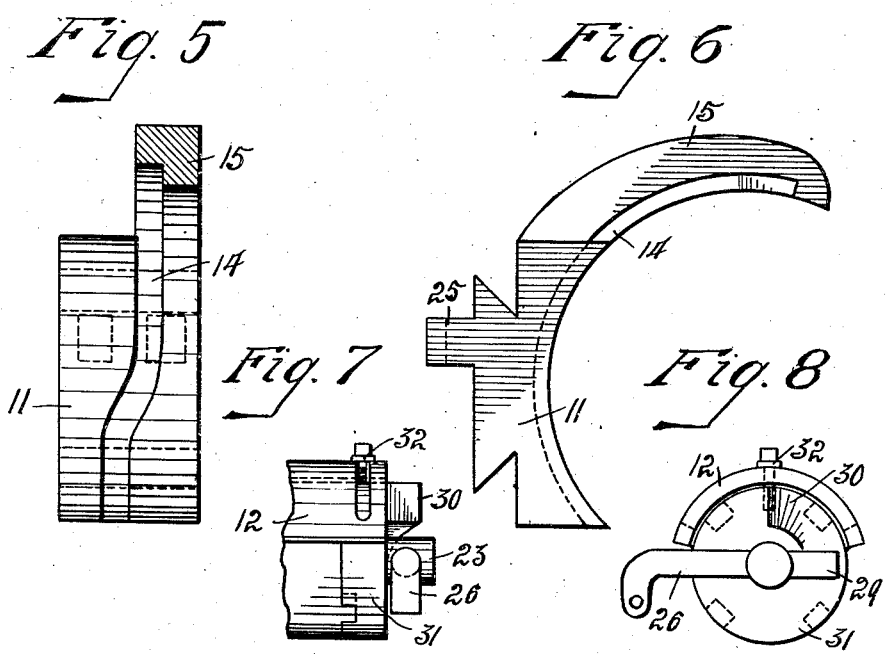

UNITED STATES PATENT OFFICE.

WILLIAM H. LANNING, JR., OF TOLEDO, OHIO.

CLUTCH.

1,002,853.      Specification of Letters Patent.    Patented Sept. 12, 1911.

Application filed June 12, 1911. Serial No. 632,720.

*To all whom it may concern:*

Be it known that I, WILLIAM H. LANNING, Jr., a citizen of the United States, and a resident of Toledo, in the county of Lucas and State of Ohio, have invented a certain new and useful Clutch; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the class of clutches employed on power-presses or other machines in which it is desired to intermittently impart a single revolution to a shaft from a continuously revolving element at the will of the operator.

The object of my invention is the provision of a simple and efficient clutch of this character, which is provided with improved means for effecting a positive and automatic release of the clutch parts at the completion of each revolution of the associated shaft and which is operable to render a second revolution of the shaft or a repeating stroke of the actuated parts impossible, or to permit such repeating as may be desired.

The invention is fully described in the following specification, and while in its broader aspect it is capable of embodiment in numerous forms, a preferred embodiment thereof is illustrated in the accompanying drawings, in which—

Figure 1 is an inner side view of the mechanism comprising my invention with parts of the same broken away. Fig. 2 is a front elevation of a portion of a machine frame with the invention associated therewith and a part in section. Fig. 3 is an enlarged inner side elevation of the clutch parts with portions broken away. Fig. 4 is an enlarged section on the line $x$, $x$ in Fig. 3 with portions broken away and other parts in section. Fig. 5 is a face view of the cam shift block with a portion in section. Fig. 6 is an outer side elevation thereof, and Figs. 7 and 8 are different enlarged details of the cam tripping mechanism.

Referring to the drawings, 1 designates a shaft with which the clutch comprising my invention is associated, and 2 a continuously rotating element which is loosely mounted on said shaft and is provided on the inner side thereof with a circular recess 3 the peripheral wall of which is provided with a series of tangentially disposed sockets 4 which are provided at their inner ends with thrust blocks 5 with which a movable clutch part is adapted to engage as hereinafter described. The thrust blocks 5 are shown as being secured within their respective sockets 4 by bolts 6, or in any other suitable manner.

Keyed to the shaft 1 at the inner side of the wheel or other element 2, with its associated end projecting within the recess 3 of said element is a collar 7. This collar has the end thereof which projects within the recess 3 of the element 2 recessed at one side of its axis, as at 8, to receive a pawl 9 which is pivoted therein, as at 10, with its free end trailing from such pivot when the collar 7 is being rotated by the driving element 2 due to an engagement of the pawl with one of the thrust blocks 5. The pawl 9 is of greater width than the depth of the recess 3 in the driving element to permit its outer edge to project without the recess in position to be engaged by the sliding cam-block 11 when such block is in normal position, as shown in Figs. 2 and 4.

A bracket 12 projects from an adjacent portion of the associated machine frame 13 and is provided with a slide-way in which a portion of the cam-block 11 engages to adapt said block for shifting movements in parallelism with the shaft 1, the bracket and cam-block being shown in the present instance as having complemental dove-tailed engaging portions. The block 11 has its inner side curved to closely embrace a portion of the collar 7 and is provided on its inner curved surface with a circumferentially extending cam-race 14 which terminates at its upper end within an extension 15 of the cam-block. The edge of the cam-block 11 which is adjacent to the drive element 2 is adapted, when in normal position, to overlap the outer edge of the pawl 9 and retain it in retracted position within its recess 8 to prevent an engagement of such pawl with the revolving thrust blocks 5 until the cam has been shifted away from the side of the drive element 2 to release the pawl.

A pin 16 projects radially from the collar 7, being mounted in a socket 17 therein, and is adapted, upon each revolution thereof with the collar, to coact with the cam race 14 in the cam block 11 to effect a positive return of the cam-block to normal pawl retracting position. When the clutch parts are at rest the pin 16 stands within the portion of the cam-race 14 which is disposed within the extension 15 of the cam-block, and upon a shifting of the block 11 to release the pawl 9 the race 14 is moved laterally from register with the pin 16, the right hand side of the portion of the race which is disposed within the block extension 15 being open for such purpose. The pin 16 in addition to serving as a means for throwing the cam-block 11 from shifted to normal position is also adapted to coact with the upper end wall of the race 14 to effect a stopping of the rotation of the collar 7 should the pawl 9 for any reason not be retracted by the block 11 from thrust block engaging position upon the completion of a revolution thereof. The pin 16 may either be projected without the collar 7 or entirely disposed within the collar socket 17, as desired, by the coaction with notches 18 therein of a screw 19, which is threaded in the collar 7, as shown in Fig. 1. A coiled spring 20 is mounted within the inner end of the socket 17 and acts on the pin 16 to influence an outward movement thereof. The retraction of the pin 16 entirely within its socket 17 permits a repeating action of the machine to adapt it for use in automatic stamping or the like. Upon a rotation of the collar 7 it will be noted that the pin 16 moves within the cam-race 14 and coacts therewith to force the cam-block 11 to neutral position before the forward or pivoted end of the pawl 9 has revolved into position for the lower edge of the cam-block to coact with the pawl to force the latter inward from engagement with the coacting thrust block 5 of the drive member 2. The pawl 9 is influenced to normally swing outward into a registering socket 4 in the drive member 2 by the action thereon of a spring pressed pin 21, which is mounted within a socket in the collar 7. When the pawl is in retracted position a spring pressed pin 22 acts on the outer side thereof in opposition to the pin 21 to hold the pawl completely retracted within its recess 8, with its end free from contact with the cam block 11. The pin 22 is carried by the cam block 11 and is moved out of register with the pawl upon a shifting of the cam-block from normal position. The spring which acts on the pin 22 is of stronger tension than the spring acting on the pin 21 to enable the former to hold the pawl retracted against the tension of the latter.

For the purpose of manually shifting the cam block 11 from normal position a shaft 23 is mounted in a portion of the bracket 12, being disposed at right angles to the shaft 1, and has its inner end provided with a laterally projecting finger 24 which works between lugs 25 on the adjacent side of the block 11, whereby a rocking of the shaft 23 will impart a shifting movement to the block 11. Projecting from the outer end of the shaft 23 is a crank arm 26, which is preferably connected by a rod 27 to the foot treadle of the machine, as is usual in machines of this character.

In order to prevent the cam-block 11 from being held in shifted position and a consequent repeating action of the machine parts should the treadle be held depressed, the rock shaft 23 is mounted for longitudinal shifting movements within its bearing bracket 12 to facilitate an outward movement of the finger 24 from engagement with the left hand lug 25 of the cam-block. The shaft 23 is yieldingly held at the limit of its inward movement by the action of a coiled compression spring 28 which encircles a portion of the shaft 23 and bears at its inner end against a shouldered portion of such shaft and at its outer end against the outer end of the socket in the bracket 12 in which it is mounted. Upon a rocking of the shaft 23 to move the cam block 11 from normal position, a pin 29, which projects laterally from its outer end and, in the present instance, comprises a continuation of the rod forming the crank arm 26, rides upon a segmental cam surface 30 at the outer end of the bracket 12 and effects an outward movement of the rock shaft 23 against the tension of the spring 28 sufficient to draw the finger 24 of said shaft outward from engagement with the left one of the cam-block lugs 25, which lug is preferably made shorter than the other for such purpose. It is thus apparent that the cam-block 11 is now free to return to its normal position upon a coaction of the pin 16 with its cam race even should the foot treadle, or other actuating part to which the rod 27 may be connected, be held depressed. The cam 30 is shown, in the present instance, as being provided upon the outer end of a collar 31 which is adjustably secured to the outer end of the bracket 12 around the end of the shaft 23. The collar 31 is rotatably adjustable to enable the cam 30 to be moved out of coacting position with the pin 29 should it be desired to prevent a releasing of the finger 24 from the cam-block lugs 25 upon a rocking of the shaft 23. The collar 31 is shown as being held in adjusted position by a screw 32 working through a slot in an overhanging portion of the bracket 12 and threading into the collar.

The operation of my improved clutch is as follows: Upon a depression of the foot treadle or other part to which the rod 27 may be attached, the shaft 23 is rocked to effect a shifting of the cam-block 11, in the present instance to the left, to move it from engagement with the pawl 9 to permit an outward movement of the free end of such pawl under the influence of the spring pressed pin 21 into engagement with a registering one of the revolving thrust blocks 5, which are carried by the driving element 2. The shifting movement of the block 11 also moves the portion of the cam race 14 therein, which is disposed in the extension 15 of the block, laterally from the pin 16 in the collar 7 to uncover and permit a revolution of such pin with the collar. Upon such revolution of the pin 16 it enters the lower end of the cam race 14 in the block 11, such race standing in suitable position for such purpose when the block is shifted to the left, and coacts with the right hand wall of such race or that disposed adjacent to the drive element 2 to move the cam block to its normal position. When the cam block has been shifted in this manner to normal position the pawl 9 will have moved into position for the lower end of the cam block to coact therewith to move it within the recess 8 in the collar 7 to release the engaged thrust block 5 of the driving element, the rotation of the collar 7 being stopped when the pin 16 is near the upper end of the cam race 14, as shown in Fig. 1. Upon a rocking of the shaft 23 to shift the cam block, the pin 29 thereon coacts with the cam 30 to effect a retraction of the finger 24 from engagement with the left hand lug 25 of the cam block so that when the block has been shifted to the limit of its movement to the left the finger 24 stands released from the left lug 25 to permit a return of the cam block to normal position upon an engaging of the same by the pin 16 should the treadle be continued depressed. If it is desired to have a repeating action of the driven parts for automatic stamping, or the like, the pin 16 may be placed in inoperative position by moving it entirely within its receiving socket 17 and engaging the outer notch 18 therein by the set screw 19.

It is apparent that I have provided a clutch which is simple in its construction and safe in its action and adapted to positively prevent a repeating of a revolution of the driven parts until the foot or other control part has been released and again depressed or moved to effect a shifting of the movable clutch parts for such purpose.

I wish it understood that my invention is not limited to any specific construction or arrangement of the parts except in so far as such limitations are specified in the claims.

Having thus described my invention, what I claim as new and desire to secure by Letters Patent, is,

1. The combination with a continuously rotating drive part, of a driven member, a pawl carried by the drive member and movable to engage thrust portions of the drive part, means normally coacting with said pawl to retain it from engagement with said thrust portions and having a cam surface, a projection revoluble with said driven member and adapted at each revolution to coöperate with said cam surface to move said means to normal position, and mechanism operable to shift said means.

2. In combination, a continuously rotating drive member, a driven member, a pawl carried by the driven member and capable of movement to engage registering portions of the drive member to cause a rotation of the driven member therewith, a cam block normally coacting with the pawl to retain it in retracted position and having a cam surface, means for shifting the cam block from normal position, and a projection on the driven member for coacting at a predetermined point in a revolution thereof with the cam surface of said block to move the block to pawl retracting position.

3. In combination, a continuously rotating drive member, a driven member, a pawl carried by the driven member and movable outward therefrom to engage a registering thrust portion of the drive member to cause a rotation of the drive and driven members in unison, a cam block embracing a portion of the driven member and shiftable in parallelism with its axis, said block having a cam surface and when in normal position coacting with said pawl to retain it retracted from engagement with the drive member, means influencing an outward movement of the pawl, means manually operable to shift the cam block from pawl engaging position, and a projection on the driven member for coacting at a predetermined point in each revolution thereof with the cam surface of said block to move the block to normal pawl retracting position.

4. In combination, a continuously rotating drive member having a recess in a side thereof concentric to its axis, said recess having its peripheral wall provided with thrust pockets, a driven member having an end thereof projecting within said recess, means carried by the driven member and movable to engage said thrust pockets to communicate rotation from one to the other of said members, manually operable mechanism having a part normally coacting with said means to retain it retracted within the driven member and movable to release such means, and a projection carried by the driven member and adapted to coact with said part to move it into position to retract said means when the driven member is at a predetermined point in a revolution thereof.

5. In combination, a continuously rotating drive member having a recess in a side thereof, the peripheral wall of which recess is provided with clutch pockets, a driven member having an end projecting within said recess, clutch means carried by said driven member and normally movable to coact with the clutch pockets of the drive means, a block shiftable in parallelism with the axes of said members and adapted to normally retain said clutch means from engagement with the clutch pockets, means manually operable to shift said block from normal position, and a part revoluble with the drive member and adapted to coact with a portion of said block to return it to normal position at a predetermined point in each revolution of such part.

6. In combination, a continuously rotating drive part, a driven part, a pawl carried by the driven part and movable outward therefrom to engage registering clutch portions of the drive part, a block encircling a portion of said driven part and normally coacting with said pawl to retain it retracted from drive part engaging position, said block having a circumferentially extending cam surface, means for shifting said block from pawl retracting position, and a pin projecting from said driven part in position to coact with the cam surface of said block to effect a shifting of the same to pawl retracting position at a predetermined point in each revolution of the driven part, and means for retaining said pin projected in block coacting position or retracted within the driven part.

7. In combination, a continuously rotating drive member, a driven member, complemental clutch parts on said drive and driven members, a shift block encircling a portion of the driven member and normally coacting with the clutch part thereof to retain it from engagement with the clutch part of the drive member, means carried by the driven member and adapted at each revolution thereof to coact with the shift block to return it to normal clutch part retracting position, and mechanism manually operable to shift said block from normal position and to release the block when shifted to permit its return to normal position.

8. In combination, a continuously rotating drive member, a driven member, said drive and driven members having coöperating clutch parts, a shift block encircling a portion of the driven member and adapted to normally stand in position to coact with and retain the clutch part of the driven member in released position, means carried by the driven member for coöperating with said block to return it to normal clutch part retracting position at a predetermined point in a revolution of the driven member, a rock shaft having a finger in shifting engagement with a portion of said block, means yieldingly retaining the finger in engagement with the block, means for rocking the shaft to shift the block from normal clutch part retracting position, and means for effecting a retraction of the finger from block engaging position upon the completion of a shifting movement of the block to permit its free return to normal position.

In testimony whereof, I have hereunto signed my name to this specification in the presence of two subscribing witnesses.

WILLIAM H. LANNING, Jr.

Witnesses:
C. W. OWEN,
E. E. THOMAS.